United States Patent [19]

Pyves et al.

[11] 4,368,100

[45] Jan. 11, 1983

[54] PROCESS FOR PRODUCING A SPRAY-DRIED AGGLOMERATED SOLUBLE COFFEE PRODUCT

[75] Inventors: Richard R. Pyves, Pointe Claire; James W. Jeffery, Agincourt, both of Canada

[73] Assignee: General Foods Inc., Toronto, Canada

[21] Appl. No.: 239,946

[22] Filed: Mar. 3, 1981

Related U.S. Application Data

[63] Continuation-in-part of Ser. No. 51,642, Jun. 25, 1979, abandoned.

[30] Foreign Application Priority Data

Jun. 28, 1978 [CA] Canada .................................. 306392

[51] Int. Cl.$^3$ ............................................. B01D 1/18
[52] U.S. Cl. ......................... 159/48.1; 159/DIG. 10; 159/DIG. 40; 159/4 B; 426/471
[58] Field of Search ............... 426/471; 159/DIG. 10, 159/DIG. 40, 4 R, 48 R, 4 B, 4 J

[56] References Cited

U.S. PATENT DOCUMENTS 3,222,193 12/1965 Hanrahan .......................... 159/48 R
3,615,723 10/1971 Meade ............................... 159/48 R
3,616,834 11/1971 Hansen et al. .................... 159/48 R

*Primary Examiner*—Norman Yudkoff
*Attorney, Agent, or Firm*—Thomas A. Marcoux; Daniel J. Donovan; Howard J. Newby

[57] ABSTRACT

Spray drying coffee extract by uniformly fluctuating the extract and concomitant inert gas flow through the drying tower spray nozzle produces a unique agglemorate-type product. A two-fluid ventur-type flowrator is employed to assist regulation of extract flow rate cycles between set maximum and minimum values. Smaller, quickly drying droplets, atomized at high flow rates of extract are caused to impact with the larger, slower drying drop (minimum extract flow rate) by the reported expansion and collapse of the spray pattern and the augmentation of turbulence by the cyclic inert gas flow rate.

9 Claims, 8 Drawing Figures

PROCESS FOR PRODUCING A SPRAY-DRIED AGGLOMERATED SOLUBLE COFFEE PRODUCT

This application is a continuation in part of application bearing Ser. No. 51,642, filed June 25, 1979, now abandoned.

TECHNICAL FIELD

This invention relates to a process for producing a spray-dried agglomerated product. Typical of the products which may be produced by the process of the instant invention are dry soluble coffee agglomerates.

BACKGROUND ART

Spray drying and agglomerating are well-known unit processes that have been employed in the food processing industry for some time. Generally, however, spray drying and agglomerating are separate processes which are carried out in stepwise fashion on coffee extracts, liquid milks and the like. It is apparent that such separate stepwise processes have a detrimental effect on the flavor quality of heat sensitive food products and leave much to be desired in terms of plant economies, utilization of equipment and throughput times. It would be desirous, therefore, if a combined spray drying and agglomerating process were able to be devised so as to increase the production capabilities of a food processing plant and at the same time to reduce the amount of equipment and throughput times that might otherwise be required.

The concept of a combined spray-drying/agglomerating process has heretofore been described in several U.S. patents, namely, U.S. Pat. No. 3,514,300 to Mishkin et al. and U.S. Pat. No. 3,151,984 to Peebles et al. In the Mishkin et al. process, recycled fines are employed in the production of an agglomerated soluble coffee powder. In the process described by Peebles et al., milk concentrate with added lactose crystals is introduced into a spray dryer and with proper control of drying conditions is discharged as an aggregated material having a moisture content of 10% to 20%. A second drying operation is then employed in the Peebles et al. process to further reduce the moisture content. In both the Mishkin et al. and Peebles et al. processes, however, it appears that the introduction of dry solids, i.e., recycled coffee fines and lactose crystals is essential for production of the desired end product.

The concept of foaming coffee extracts and other extracts and suspensions of food products to control final product color, density and particle size has also been described heretofore. Thus, U.S. Pat. No. 2,788,276 to Reich et al. teaches a process for spray-drying a foamed material such as coffee. However, the objective referred to in the patent is that of producing a product with discrete spherical structures which are not clumped, aggregated or otherwise agglomerated.

It is well known in the art of spray drying that, for a particular spray nozzle system, optimum atomization occurs when the liquid flow rate exiting from the nozzle is of sufficient magnitude to cause the nozzle to deliver the spray over a wide area in the form of small droplets (fine spray). Conventionally, high pressure positive displacement pumps are employed to force the liquid through the spray nozzle at the desired, substanitally uniform, flow rate to form a spray pattern which conforms to the structural dimensions of the drying tower and which has drop size uniformity which conforms to the drying capability of the tower.

As is well known, reciprocating positive displacement pumps develop a fluctuating pressure and fluctuating flow rate of discharge liquid. The fluctuating flow rate of liquid through the spray nozzle creates fluctuations in the spray pattern (conical angle of discharge) and also non-uniformity of drop size in the spray. For the most part, in conventional spray drying practice, the magnitude of these fluctuations is minimal and creates a change in conical spray angle of about 3°–4°. Conventionally, operations are conducted with systems which develop substantially uniform flow rates. In many instances, a gear-type positive displacement or multi-piston pump is employed to assure the desired uniformity of flow rate at the high pressures. Also, in many installations a dome-type accumulator is located between the pump discharge and the spray nozzle to even out the flow rate to the nozzle.

For some liquids, namely cottage cheese whey, fluctuations in flow rate through the spray nozzle (commonly called "slugging") when using a high pressure recprocating pump has been minimized by the injection of gas into the whey in the system between the pump and the spray nozzle (cf. Hanrahan, U.S. pat. No. 3,222,193).

For a particular spray drying system, the flow rate through the spray nozzle should be of a value for the nozzle to deliver a spray of desired atomization without endangering the operation by creating too wide a spray angle and thus wetting the side walls of the drying tower. Too low a flow rate will create little or no break-up of the liquid into drops or will develop drops of such large size they will be incompletely dried in the tower.

SUMMARY OF THE INVENTION

In contrast to the teachings and efforts of the prior art, the method of spray drying of the instant invention purposely utilizes flow rate fluctuations of considerable magnitude of coffee extract liquid through the spray tower spray nozzle to successfully develop a physically unique soluble coffee agglomerate product. The flow rate fluctuations of coffee extract through the spray nozzle are controlled to uniformly cycle (sine wave) between set maximum and minimum flow rate values.

Concurrently, flow rates of inert gas, such as $N_2$, through the spray nozzle are controlled to uniformly (sine wave) cycle between set maximum and minimum values. The liquid coffee extract and gas flow rate cycles are controlled to be directly out of phase (180° sine wave curve out of phase).

The liquid coffee extract maximum flow rate through the spray nozzle causes the nozzle to develop a spray pattern of a maximum area of coverage; i.e., maximum conical angle of spray of fine droplets just short of wetting the side walls of the drying tower.

The liquid coffee extract minimum flow rate causes the spray nozzle to develop a spray having a significantly smaller conical spray angle and to develop drops of a much larger size than those developed at the maximum flow rate. The large drops are slower to dry than the small drops from the wide spray angle.

The concurrent cyclic inert gas flow (directly out of phase with the liquid flow rate through the respective spray nozzle) is at the highest flow rate when the largest coffee extract drops are formed and sets up (along with the tower drying air) a turbulence which, accompanied by the cyclic collapse and expansion of the spray angle (spray pattern) causes the relatively large number of fine particles from the rapidly dried small droplets to impact the fewer, large, partially dried, particles produced from the slower drying large drops to form agglomerates of coffee particles. The agglomerates are unique in that they are essentially comprised of several relatively large, substantially spherical, particles of dried soluble coffee partially embedded, or otherwise adhered to a large particle, or particles, of partially dried soluble coffee (cf. FIGS. 5 and 6). These agglomerates differ in appearance from conventional soluble coffee agglomerates which are (usually) formed from uniformly sized wetted small particles (cf. FIGS. 6 and 7).

The critical aspect of the invention and that which leads to the production of the desired unique agglomerates is the capability of the system to rapidly cycle the fluctuating flow of the liquid coffee extract and the inert gas stream (opposed cycle) through controlled maximum and minimum flow rates. A two-fluid venturi flow regulator (flowrator) is successfully used for this critical phase of the method of the invention.

As the concept depends for its ultimate success on having large drops of slowly drying liquid present to impact with the smaller dried or partially dried particles, a conventional afterdrier may be employed to finish dry the agglomerates to a desired uniform dryness.

The process has the advantage that it eliminates the necessity of incorporating standard agglomerating equipment such as agglomerating towers in a soluble coffee processing unit. Moreover, the process reduces the detrimental heating effects on the flavor quality of the soluble coffee as compared with the stepwise process of spray drying followed by agglomerating and allows for an increase in the capacity of a soluble coffee processing unit by permitting the conversion of an existing agglomerating tower into a spray agglomeration tower.

BRIEF DESCRIPTION OF THE DRAWINGS

A more complete understanding of the method of the invention may be obtained by reference to the following description and claims, taken together with the following drawings in which:

DETAILED DESCRIPTION OF THE INVENTION

Figure 1:
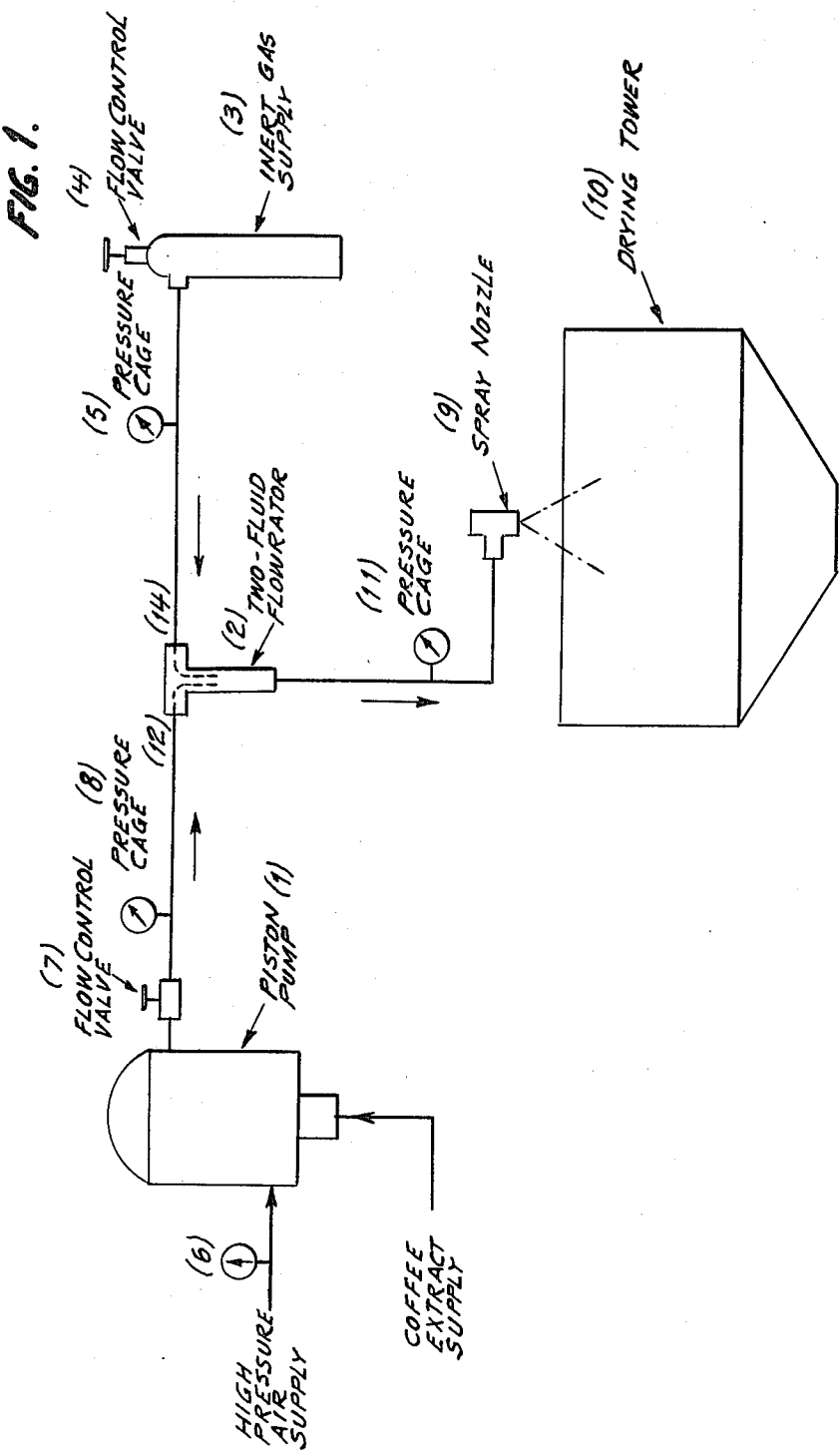
FIG. 1 is a schematic sketch of the arrangement of the principal equipment components employed, including the coffee extract high pressure reciprocating pump, the inert gas supply source, the two-fluid venturi flowrator and the drying tower spray nozzle, and illustrates the flow path of each of the two fluids.

Referring to FIG. 1, liquid coffee extract is fed by means of a high pressure, single cylinder air driven piston pump (1) (supply on demand) to the liquid intake (12) of a two-fluid flowrator (2). An inert gas supply source (3) under high pressure is fed to the gas intake (14) of the two-fluid flowrator (2). The gas pressure is adjusted to remain substantially constant at a set value by adjustment of valve (4) and pressure gage (5). The flow rate of coffee extract is partially controlled (see below) by adjustment of the air pressure (6) of the air driving the pump and, optionally, the coffee extract flow control valve (7). The flow rate variation is indicated by the change in pressure at pressure gage (8) in the conduit to the two-fluid flowrator. The motive force from the air piston pump and the inert gas supply pressure is used to move the mixture of extract and inert gas through a conventional high pressure core-type spray nozzle (9) in the drying tower (10). The combined coffee extract and gas pressure at the intake of the spray nozzle is measured by the pressure gage (11). The difference in pressure readings at gages (8) and (11) represents the liquid coffee extract pressure differential ($\Delta P_L$) across the two-fluid flowrator (2) and the inert gas differential pressure ($\alpha P_G$) across the two-fluid flowrator is calculated from the difference in pressure readings at gages (11) and (5).

Figure 2:
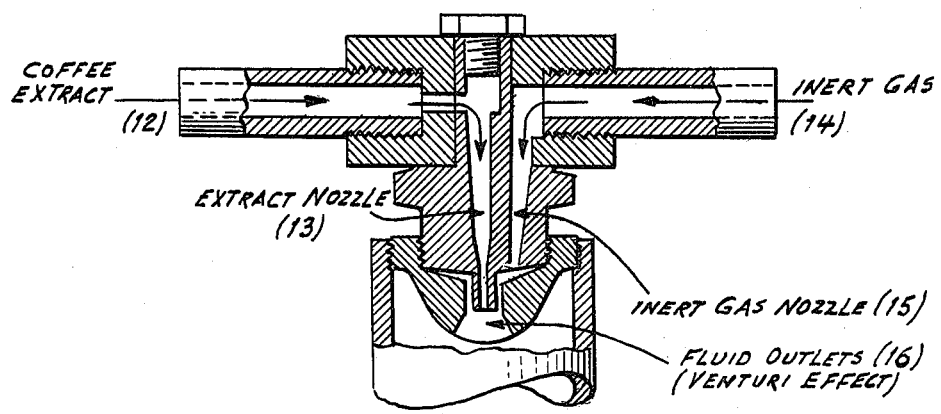
FIG. 2 is a view, in partial section, of the two-fluid venturi flowrator.

The two-fluid flowrator (FIG. 2) is of the venturi-type and is (or is equivalent to) an assembled unit manufactured by Spraying Systems Co., Wheaton, Illinois as shown and described on pages 47 et seq of Industrial Catalog 27 (1978). As shown in FIG. 2, the coffee extract enters at port (12) and passes through a constricting passageway, "extract nozzle" (13). The inert gas ($N_2$) enters at port (14) and passes through a contricting passageway, "inert gas nozzle" (15). Both "passageways" are of the type to constrict flow such that the velocity (at constant pressure) of both fluids increases at the points (orifices) of outlet (16) and the venturi effect of each influences the flow rate of the other.

Thus, the two-fluid flowrator not only controls the flow rate of both fluids (coffee extract and inert gas) but also affects the flow rate of one fluid with respect to the flow rate of the other. Thus, even though the pressure (5) of the inert gas to the flowrator intake remains constant, a change in coffee extract fluid pressure (8) (increase) at the flowrator intake port not only causes a controlled increase in extract flow but also provides a smaller than expected (absent the flowrator) decrease in inert gas flow due to the partly compensating venturi effect. Similarly, a decrease in flow rate of extract through the flowrator creates a slight increase in inert gas flow even though the upstream gas pressure remains substantially constant and may be at a lower intake pressure than that of the extract.

As will be understood by those knowledgeable in the art of fluid flow, it is the pressure differential ($\Delta P_L$) across the two-fluid flowrator coffee extract passage as measured by gage readings (8)–(11) which influences the coffee extract flow rate and similarly, it is the pressure differential ($\Delta P_G$) across the two-fluid flowrator inert gas passage as measured by gage readings (5)–(11) which influences the flow rate of inert gas. In addition, the venturi effect in the two-fluid flowrator developed by each fluid further influences (partly compensates the reduction in flow when the $\Delta P$ is reduced) the flow rate of the other fluid. The flowrator is designed such that the venturi effect of the coffee extract flow influences the inert gas flow to a greater degree than the gas flow venturi effect has on the extract flow rate.

As stated previously, the combined coffee extract and inert gas pressure at the intake (11) to the spray nozzle drives the mixture through the nozzle and atomizes the mixture in the tower. By holding the inert gas pressure constant (substantially) at (5), the single cylinder pump (6) fluctuating pressure at (8) is changed by the restrictive orifices of the flowrator to a substantially constant pressure at (11) even though the flow rate of coffee extract fluctuates.

In summary, the spray nozzle flow rate requirements conform to the drying tower structural dimensions and drying capability. The flowrator is sized to provide the desired maximum and minimum coffee extract and inert gas flow rates to conform with the spray nozzle atomization requirements (conical spray angles and drop sizes). The coffee extract pump is oversized and would deliver vastly larger amounts of extract to the spray nozzle if the flowrator were not in the system. The flowrator reduces the overall flow rate of both coffee extract and inert gas. The flowrator, however, causes wide fluctuations in the overall reduced flow rate of coffee extract when the extract pressure differential across its intake and the intake to the spray nozzle are slightly altered. The venturi effect of the flowrator causes less magnitude of fluctuation of the inert gas flow (the venturi effect partly compensates for the slight increase in overall pressure at the entrance to the spray nozzle when the extract is at its maximum flow). The maximum flow of extract, accompanied by the minimum flow of inert gas (and vice versa), maintain a substantially constant pressure at the intake to the spray nozzle—it is the change in flow rate of the liquid coffee extract which has the far greater effect on the angle of spray delivery and drop size.

Thus, for a flowrator of the types described above, the following changes (fluctuations) in liquid coffee extract and inert gas ($N_2$) flow rates to a spray nozzle located in a drying tower are obtainable.

TABLE I

| Pressure differential ($\Delta P$) across the two-fluid flowrator | | | | | |
|---|---|---|---|---|---|
| Inert Gas (lb/in$^2$) | Extract (lb/in$^2$) | Extract Flow Rate (lb/hr) | % Increase | Inert Gas Flow Rate S.CF/min. | % Decrease |
| 31 | 20 | 35 | — | 2.8 | — |
| 31 | 30 | 79 | 126 | 2.5 | 10.4 |
| 31 | 40 | 140 | 77 | 2.2 | 12.0 |
| 31 | 60 | 250 | 150 | 2.0 | 9.1 |
| 35 | 20 | 25 | — | 3.1 | — |
| 35 | 30 | 66 | 164 | 2.9 | 6.5 |
| 35 | 40 | 100 | 52 | 2.6 | 10.3 |
| 35 | 60 | 220 | 120 | 2.4 | 7.6 |
| 25 | 20 | 55 | — | 2.4 | — |
| 25 | 30 | 105 | 91 | 2.1 | 12.5 |
| 25 | 40 | 185 | 76 | 2.0 | 4.7 |
| 25 | 60 | 300 | 62 | 1.9 | 5.0 |

From Table I it can be observed that, at a constant inert gas pressure differential ($\Delta P_G$) of 31 lb/in$^2$, a drastic increase (150%) in flow rate of coffee extract from the flowrator is obtained if the single piston pump on its pressure stroke increases the pressure of the liquid intake to the flowrator to increase the coffee extract differential pressure ($\Delta P_L$) across the flowrator from 40 lb/in$^2$ to 60 lb/in$^2$ while, concurrently, the inert gas flow is limited to a 9% reduction by the venturi effect of the flowrator.

Without the installation of the venturi-type flowrator in the system and for the same inert gas pressure differential and change in coffee extract pressure differential, the flow rate of the coffee extract is increased only about 20% and the inert gas flow (at 31 lb/in$^2$) is reduced to nil.

Consequently, the venturi-type flowrator provides for large variations in coffee extract flow to the spray nozzle with concomitant small variations in inert gas flow even though the coffee extract liquid pressure to the intake of the flowrator may be greater than that of the inert gas pressure.

Employing similar flowrators but of different sizes will, of course, permit larger (or smaller) flow values for the two fluids but will have similar affects on the flow rate fluctuations.

Thus, although the flow of coffee extract will fluctuate throughout a wide range and cause the spray nozzle to alternate the spray pattern from maximum to minimum spray angles, the inert gas flow is always present to create the desired turbulence within the spray patterns.

Figure 3:
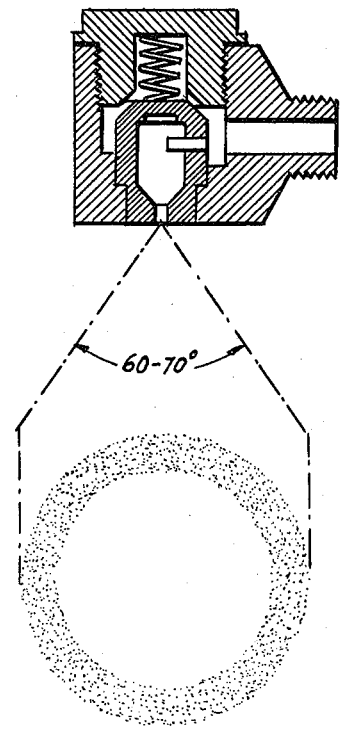
FIG. 3 is a sectional view of the spray nozzle and shows the developed spray angle and pattern of the exiting coffee extract at maximum flow rate.
Figure 4:
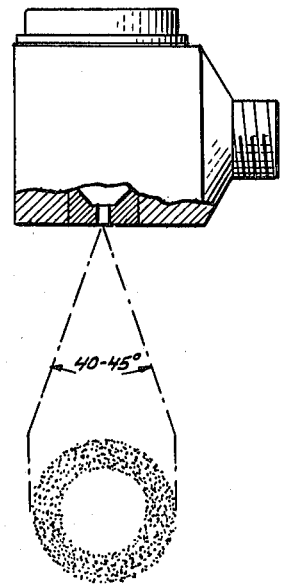
FIG. 4 is a partial sectional view of the sampe spray nozzle as shown in FIG. 3 and shows the developed spray angle and pattern of the exiting coffee extract at minimum flow rate.

At the maximum coffee extract flow rate through the spray nozzle, the spray angle of droplet discharge is at its maximum (cf. FIG. 3) and the droplet size is minimum. Conversely, the minimum flow of extract through the spray nozzle yields drops of the largest size and the smallest spray angle pattern, (FIG. 4). Also, the inert gas flow rate is at its peak when the drops are of the largest size (when the highest degree of turbulence is desired) and at its lowest rate when the lighter, smallest drops are being sprayed.

The controlled alternating expansion and collapse of the spray pattern, within the required limits dictated by the drying tower dimensions and atomization energy needs, plus the ever present, but varying inert gas flow rate, create the turbulent conditions for the production of the agglomerated coffee product. The more rapidly drying smaller coffee particles impact the slower drying wetter larger particles to create agglomerates which are comprised of small spherical particles fixed to a larger particle (or particles) of partially dried soluble coffee. The agglomerate is then dried to a desired degree as it falls to the base of the tower.

Figure 5:
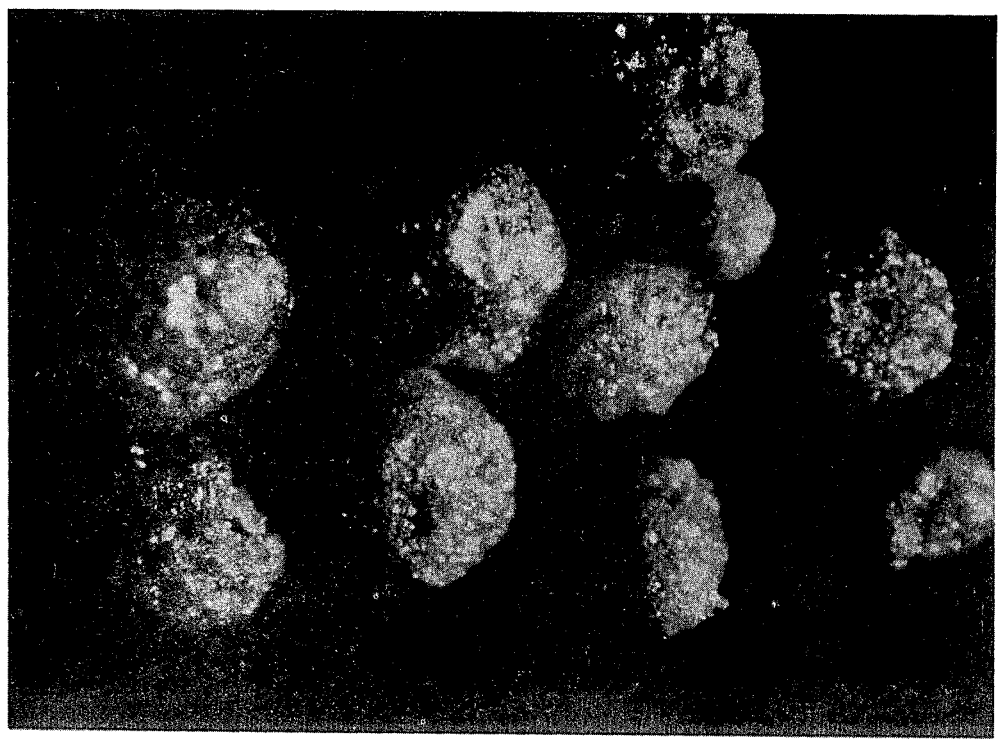
FIG. 5 is a photomicrograph (magnification 61 X) of representative soluble coffee spray-dried particles, which when adhered together, form the agglomerates produced in accordance with the present invention.
Figure 6:
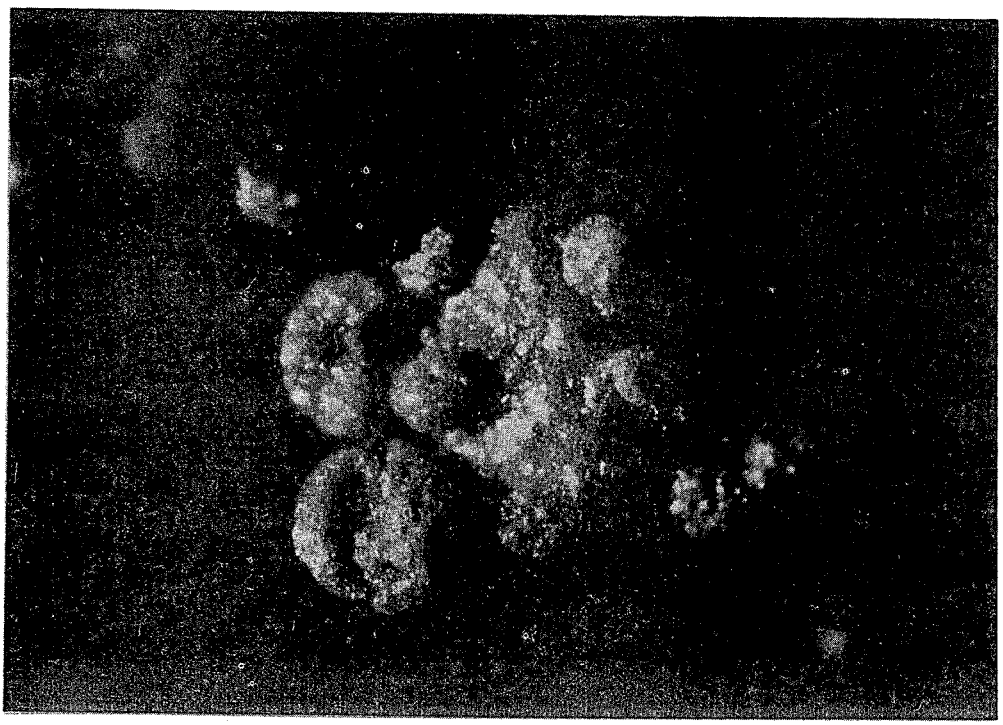
FIG. 6 is a photomicrograph (magnification 61 X) of a soluble coffee spray agglomerate produced in accordance with the present invention.
Figure 7:
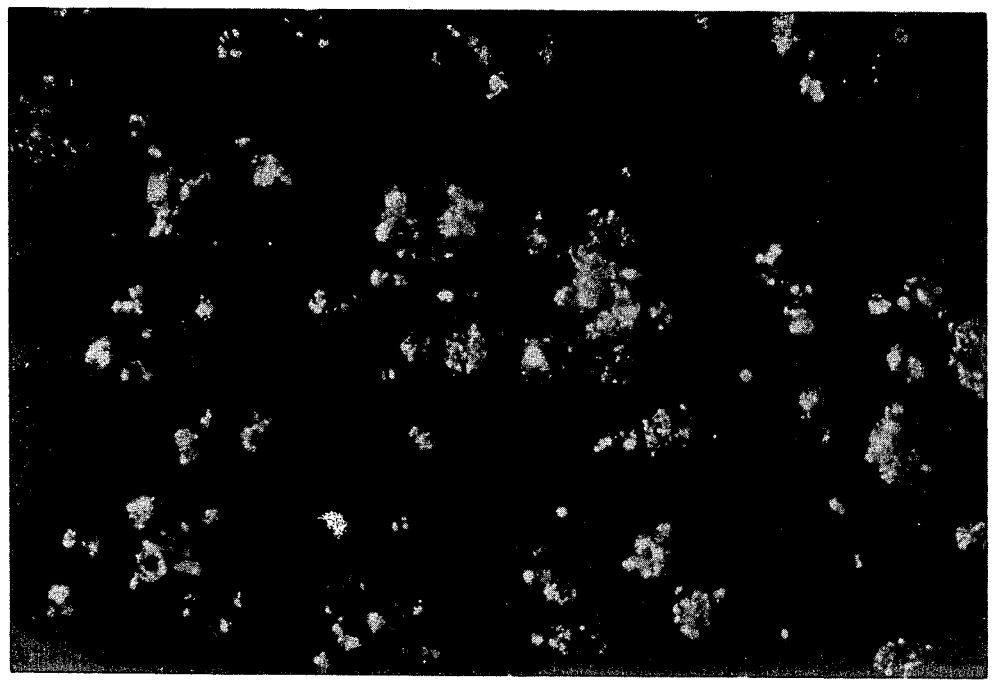
FIG. 7 is a photomicrograph (magnification 61 X) of spray dried soluble coffee powder produced by a conventional commercial process.
Figure 8:
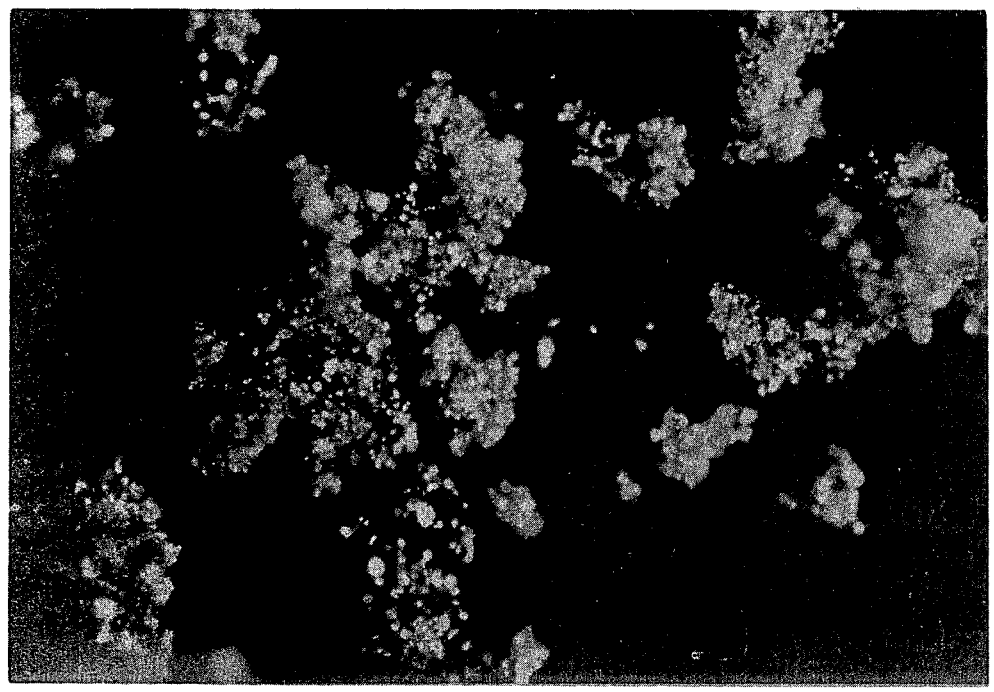
FIG. 8 is a photomicrograph (magnification 61 X) of an agglomerated soluble coffee product prepared with conventional commercial equipment using the spray dried soluble coffee powder shown in FIG. 7.

FIGS. 5 and 6 illustrate spray agglomerates produced in accordance with the process of the present invention. FIG. 7 illustrates a spray dried soluble coffee powder produced by a conventional commercial process. FIG. 8 shows an agglomerated soluble coffee product prepared on conventional commercial equipment utilizing the spray dried soluble coffee powder illustrated in FIG. 7.

The total magnification is 61 X for the photomicrographs shown as FIGS. 5 to 8. The relative particle size and shape of the particles shown in FIG. 5 may be contrasted with those shown in FIG. 7 and the relative particle size and shape of the product shown in FIG. 6 may be contrasted with that shown in FIG. 8. Further, the unique physical form of the particles and the agglomerates obtainable by the process of this invention may be noted from FIGS. 5 and 6.

EXAMPLE 1

Coffee extract at 34% concentration and at 98° F. was passed by means of a air piston pump (Graco Model No. 206842) manufactured by Gray Company, Inc., Minneapolis, MN through a Spraying Systems Co. two fluid venturi-type flowrator device (set-up No. 23B. cf. page 50 of Industrial Catalog No. 27, 1978). The valve on the flowrator was adjusted for full flow. Nitrogen was concurrently passed through the flowrator.

The extract and nitrogen gas pressures at the intake of the two-fluid flowrator were 160–170 psig and 120 psig, respectively. The discharge from the two-fluid flowrator was then passed through a conventional spray nozzle (Whirljet Type 1—1 Spraying Systems, Co., Wheaton, Illinois) in the spray dryer where the nozzle pressure was maintained at 126 psig (substantially constant). The Graco air piston pump utilized to deliver the extract pressure to the two-fluid venturi-type flowrator was also utilized as the motive force to provide the required hydraulic pressure to the spray nozzle.

The degree and frequency to which the extract pressure varied was a function of the relative size of the feed pump to both the two-fluid flowrator and the spray nozzle and, also, the feed rate required at the spray nozzle. In this particular example with an average feed rate of 142 lbs/hr of extract the spray nozzle pattern oscillated once every 10 seconds. At the low end of the piston stroke (suction) the extract pressure was about 10 lb/in$^2$ lower than at the high end of the piston stroke resulting in a significantly reduced (30%) liquid feed rate at this point. The following data were obtained:

TABLE II

| Extract Pressure At Flowrator Intake (lbs/in$^2$) | Extract Flow Rate Thru Spray Nozzle (lbs/hr.) | N$_2$ Pressure At Flowrator Intake (lbs/in$^2$) | N$_2$ Flow Rate Thru Spray Nozzle SCF/min | Spray Nozzle Discharge Spray Angle (0) | Particle (Drop) Size Distribution (μ) |
|---|---|---|---|---|---|
| 160 | 110 | 120 | 2.4 | 40–45 | 300–1000 Avg.–700 |
| 170 | 170 | 120 | 2.1 | 60–70 | 150–500 Avg.–400 |

Atomization ranged from considered normal at the highest extract flow rate to marginal at the lowest extract flow rate.

The spray dryer inlet air temperature was maintained at 415° F; the agglomerated product had a bulk density of 12.3 gms/100 cc. The color of the soluble coffee agglomerates was 33.0 photo units (as measured by a Lumetron Photovoltmeter; (cf. U.S. Pat. No. 3,821,430) and a mean particle size of 735 μ with a standard deviation of 300 μ. For this particular example, the product moisture content out of the spray dryer was 5–5.5%. A conventional after-dryer could be employed to reduce the moisture to any desired lower value. The example product contained a relatively small amount (10–25% by wgt.) of satellite particles (fines) but these particles were larger than those satellites produced in conventional spray drying. A microscopic inspection of the agglomerates revealed small hollow spherical particles adhered to one or more larger particles, also, in most cases to have hollow centers. FIG. 7 and 8 are photomicrographs of the product of this example. As with typical spray drying of soluble coffee, higher extract concentrations would produce denser particles (and agglomerates) with the particular system described in this example.

EXAMPLE 2

Soluble coffee agglomerates were produced according to the method of the invention with processing conditions similar to those in Example 1 but employing a different pump, two fluid venturi-type flow regulator, spray nozzle, and a larger spray drying tower.

Coffee extract at 34% concentration and at 97° F. was delivered by a Graco® Model No. 206421 air piston pump through a Spraying System Co. two fluid venturi-type flow regulator (flowrator) set-up No. 42 (cf. page 48 of Industrial Catalog No. 27, 1978) to a Whirljet Type 5-6 spray nozzle. Nitrogen gas was concurrently forced through the flowrator and spray nozzle.

The pressure at the intake to the spray nozzle was maintained at 135 lb/in$^2$ (substantially constant).

For this run, with an average feed rate of 663 lbs/hr, the air driven single cylinder pump created a spray nozzle pattern oscillation once every 3 seconds. At the low end of the piston stroke (suction) the extract pressure was approximately 78 lbs/in$^2$ lower than at the high (top) of the piston stroke. The following data were obtained:

TABLE III

| Extract Pressure At Flowrator Intake (lbs/in$^2$) | Extract Flow Rate Thru Spray Nozzle (lbs/hr.) | $N_2$ Pressure At Flowrator Intake (lbs/in$^2$) | $N_2$ Flow Rate Thru Spray Nozzle SCF/min | Spray Nozzle Discharge Spray Angle (0) | Particle (Drop) Size Distribution (μ) |
|---|---|---|---|---|---|
| 156 | 241 | 160 | 3.0 | 40–45 | 300–1000 Avg. 700 |
| 234 | 1085 | 160 | 2.4 | 60–70 | 120–200 Avg. 400 |

Again, atomization ranged from considered normal at the highest extract flow rate to marginal at the lowest extract flow rate.

Spray dryer conditions in the larger tower were maintained to dry the agglomerated product to about 5% moisture. The physical properties of the soluble coffee agglomerated product were similar to those of the product obtained in Example 1.

We claim:

1. A process for producing a spray dried agglomerated soluble coffee product which comprises:
   (a) providing an aqueous soluble coffee extract having flow rate fluctuations which are controlled to uniformly cycle between set maximum and minimum flow rates;
   (b) combining an inert gas at substantially constant pressure with said extract, said inert gas having a flow rate which is directly out of phase with said extract flow rate;
   (c) feeding the combination of said extract and inert gas through a spray nozzle in a drying tower thereby producing a spray of extract from the nozzle of minimum droplet size and a spray angle of maximum area of coverage when the extract flow rate is at its maximum and a spray of extract from the nozzle of maximum droplet size and a spray pattern having a significantly smaller conical spray angle when the flow rate is at its minimum; and (d) producing coffee agglomerates when smaller coffee droplets impact larger coffee droplets in the drying tower.

2. The process of claim 1 wherein the inert gas is nitrogen.

3. The process of claim 1 wherein the aqueous extract contains about 35% by weight of soluble coffee solids.

4. The process of claim 1 wherein the cyclic flow rate fluctuations for both liquids is substantially uniform and has a period ranging from about three seconds to about ten seconds.

5. The process of claim 1 wherein the combining of said extract and said inert gas is accomplished by the use of a two-fluid venturi flowrator.

6. The process of claim 5 wherein the magnitude of change and flow rate of the aqueous coffee extract through the two-fluid venturi flowrator and spray nozzle is greater than the magnitude in change of the concomitant flow rate of the inert gas through the two devices.

7. The process of claim 1 wherein the maximum flow rates of extract is that flow rate which exits from the spray nozzle in the form of a spray having a conical spray angle ranging from about 60° to about 70°.

8. The process of claim 1 wherein the minimum flow rate of extract is that flow rate which exits from the spray nozzle in the form of a spray having a conical spray angle which ranges from about 40° to about 45°.

9. The process according to claim 1 further comprising the step of finished drying the agglomerates to a desired uniform dryness with an afterdrier.

* * * * *